Figure 1:
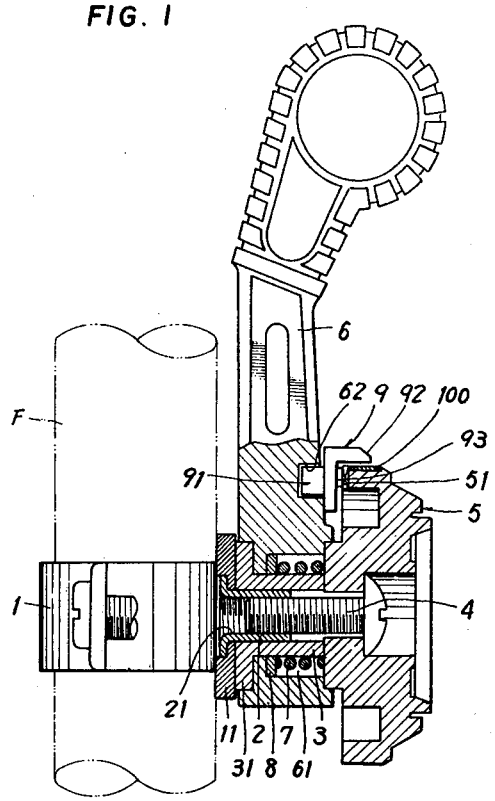

United States Patent [19]

Watarai

[11] 4,270,481
[45] Jun. 2, 1981

[54] LEVER OPERATING DEVICE FOR GEAR-SHIFTING MEANS OF A BICYCLE OR THE LIKE

[75] Inventor: Etsuyoshi Watarai, Sakai, Japan

[73] Assignee: Shimano Industrial Company Limited, Osaka, Japan

[21] Appl. No.: 899,294

[22] Filed: Apr. 24, 1978

[30] Foreign Application Priority Data

Apr. 23, 1977 [JP] Japan ............................. 52-52018[U]

[51] Int. Cl.³ .......................... B60K 20/06; F16C 1/10
[52] U.S. Cl. .................................... 116/28.1; 74/475; 74/489; 74/501 R
[58] Field of Search .............. 74/489, 488, 487, 473 P, 74/523, 501 R, 473 R, 475; 116/28.1

[56] References Cited

U.S. PATENT DOCUMENTS

| 2,785,586 | 3/1957 | Schwerdhofer | 74/489 |
| 3,383,940 | 5/1968 | Brilando et al. | 74/501 |
| 3,534,627 | 10/1970 | Schwerdhofer | 74/489 |
| 3,701,333 | 10/1972 | Schwerdhofer | 116/28.1 |
| 3,943,794 | 3/1976 | Shimada | 74/501 R |

Primary Examiner—Kenneth Dorner
Attorney, Agent, or Firm—Stevens, Davis, Miller & Mosher

[57] ABSTRACT

A lever operating device has a lever supported rotatably with respect to a fixed shaft for retaining one end of a control wire to control gear-shifting means of a bicycle. The lever operating device includes an indicator which is provided at the lever which is adapted to move in the turning direction of the lever within a fixed range corresponding to the play existing in the control wire, whereby when the lever is turned the indicator moves lagging behind the turning lever by a fixed distance corresponding to the play of the control wire.

11 Claims, 14 Drawing Figures

LEVER OPERATING DEVICE FOR GEAR-SHIFTING MEANS OF A BICYCLE OR THE LIKE

This invention relates to a lever operating device for a gear-shifting means of a bicycle or the like.

Generally, this kind of lever operating device is attached to a handle bar or a frame, such as a top tube, of the bicycle or the like (hereinafter called the bicycle) so as to control the gear-shifting means corresponding to multi-speed sprockets provided at a rear wheel and crank means of the bicycle, whereby a driving chain is switched to a selected one of the sprockets for changing the bicycle speed.

The lever operating device has a lever rotatably supported to a fixed member fixed to the bicycle frame, and at the lever or a member secured to the lever is attached one end of a control wire connecting the lever with the gear-shifting means, the wire being controlled by turning the lever. The lever has an indicator which is fixed thereto and moves following the same. A cover supported to the fixed member has marks respectively respresenting speed-change stages so that a rider may read from the indicator the mark representing the speed-changed stage then being used.

The control wire is retained at its one end to the lever and at the other end to a movable member of the gear-shifting means, and is covered at a greater portion between both the retained ends by an outer guide sheath. The wire and sheath are mounted flexibly to the tube members of the bicycle frame. Between the outer periphery of the control wire and the inner periphery of the sheath is provided a given clearance for facilitating insertion of the wire into the sheath and for moving the wire with ease with respect to the sheath. The push-pull type control wire particularly has a large clearance, whereby when the lever is turned to operate the wire for changing the speed the wire only moves for a period of time to compensate for the clearance. As a result when the lever is turned from the high speed stage to the low speed stage and vice versa, it is shifted from its proper position, hence, the indicator does not align with the proper mark and the rider is not properly apprized of the speed-changed stage even when looking at the indicator.

In other words, the clearance between the wire and sheath and the flexibility inherent in the mounting of the wire and sheath to the bicycle causes the lever to be shifted to the extent of the clearance when changing speed from low to high and from high to low, so that the indicator is, even though initially set to coincide accurately with the mark corresponding to the high or low speed stage, out of position to the scale markings because of a shift of the lever over the proper scale marking.

The present invention has been designed to overcome this problem. An object of the invention is to provide a lever operating device for a gear-shifting means whose indicator can always align with the mark corresponding to a selected speed-change stage even when a push-pull type wire is used as the control wire of the device, thereby enabling the rider to accurately read the selected speed-change stage.

The present invention overcomes indicator misalignment by providing an indicator attached to the lever such that it is movable in the direction of turning the lever and in a fixed range with respect thereto, whereby when the lever moves the indicator moves but lagging behind the lever at a constant distance.

In greater detail, the indicator is made movable in the direction of turning the lever within a given range and contacts with a cover marked with the speed-change stages so as to be subjected movement resistance when turning the lever is turned, whereby when the lever begins to turn, the indicator is stationary and the lever only moves, and then the indicator moves to follow the lever after the lever turns a certain amount corresponding to the amount of play in the control wire.

Figure 2:
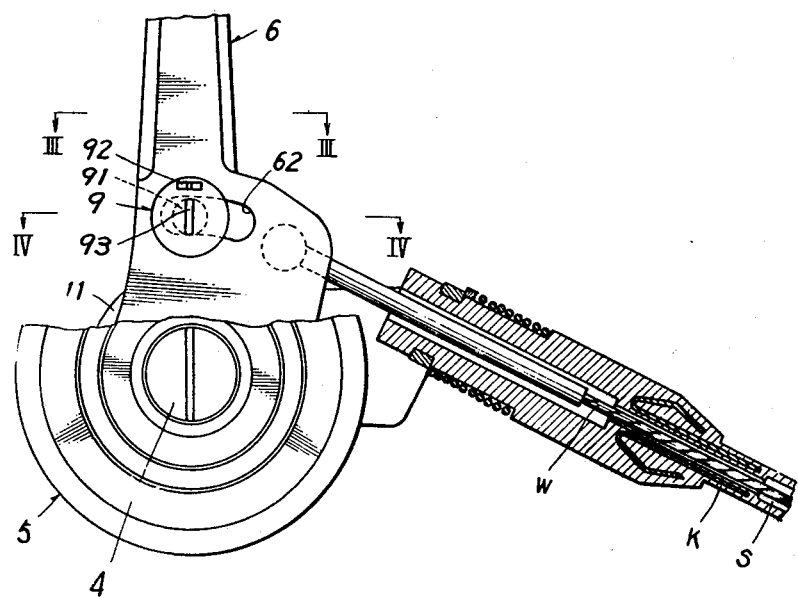
Figure 3:
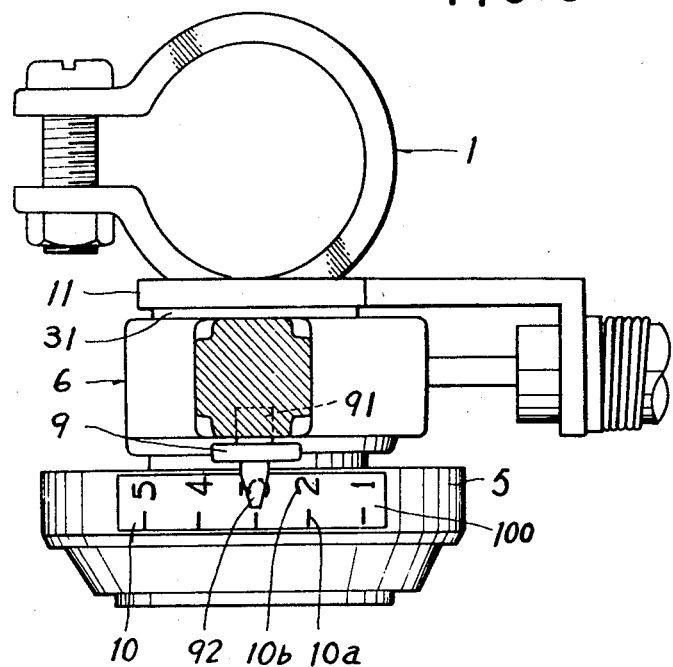
Figure 4:
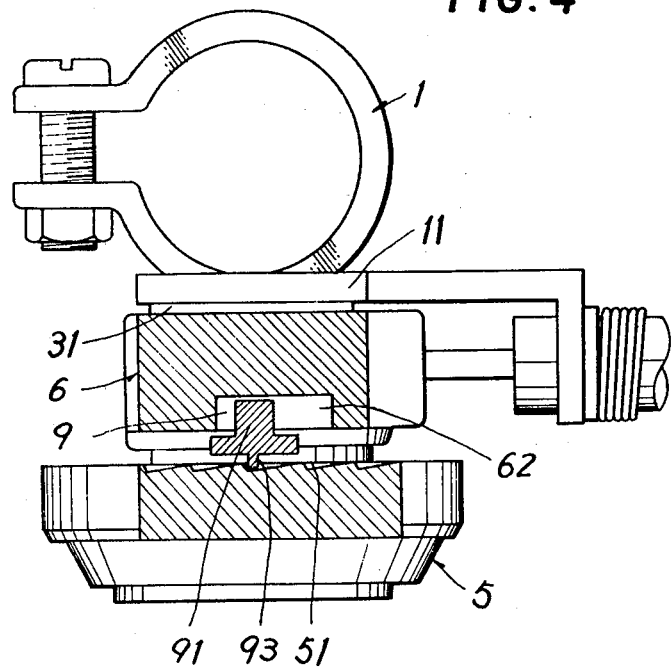
Figure 5:
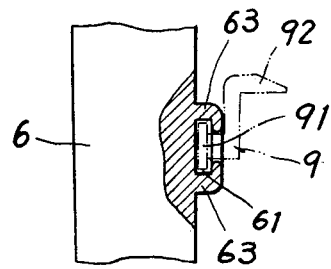
Figure 6:
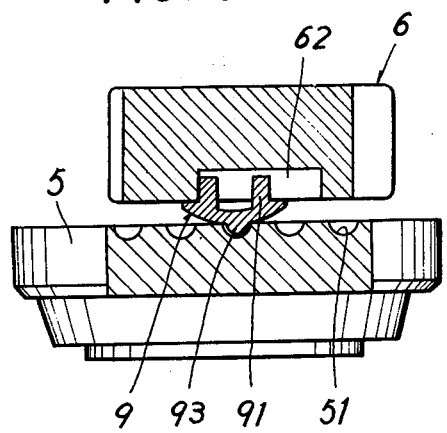
Figure 7:
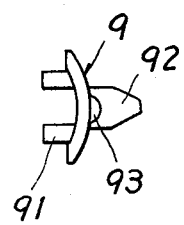
Figure 8:
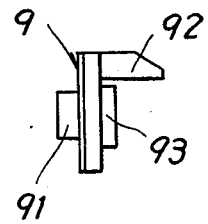
Figure 9:
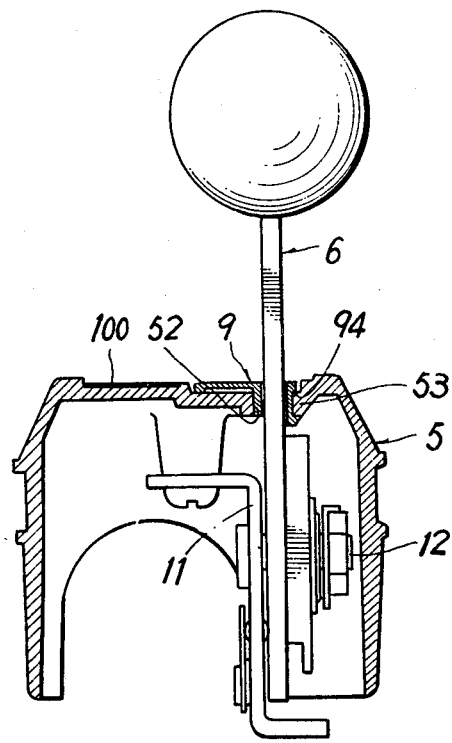
Figure 10:
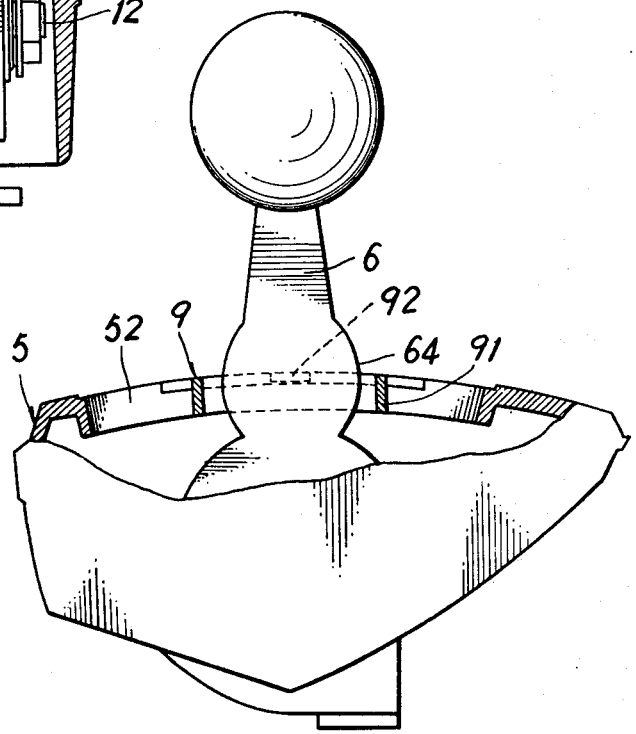
Figure 11:
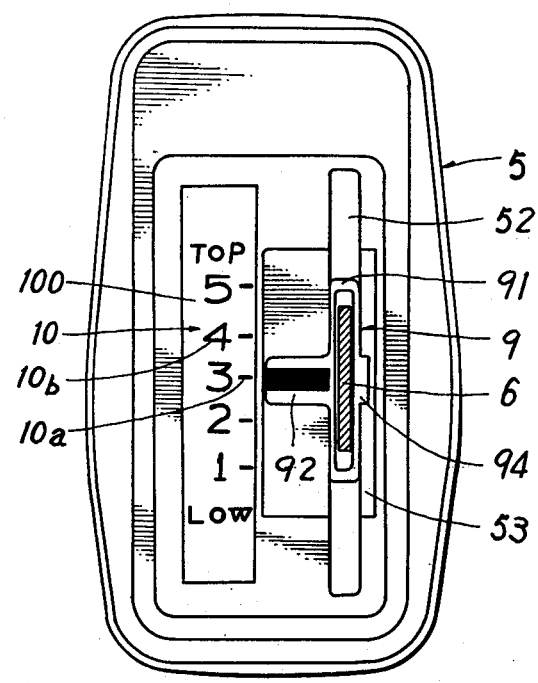
Figure 12:
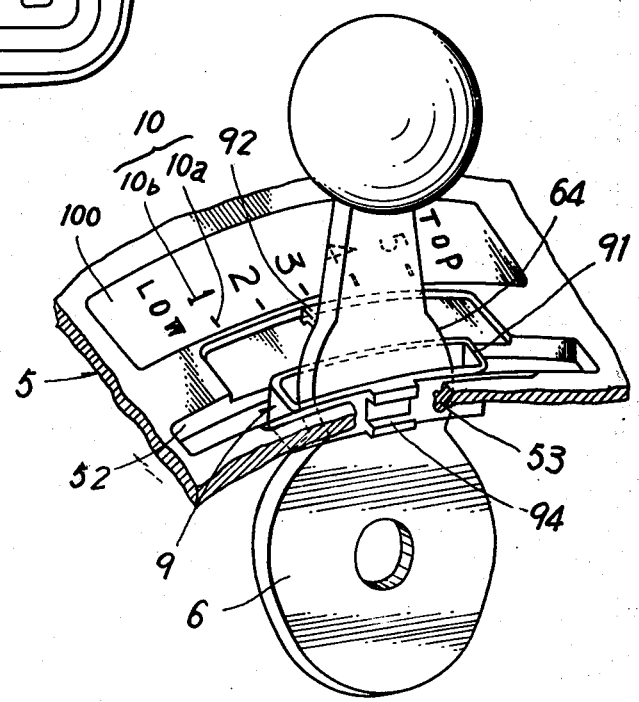
Figure 13:
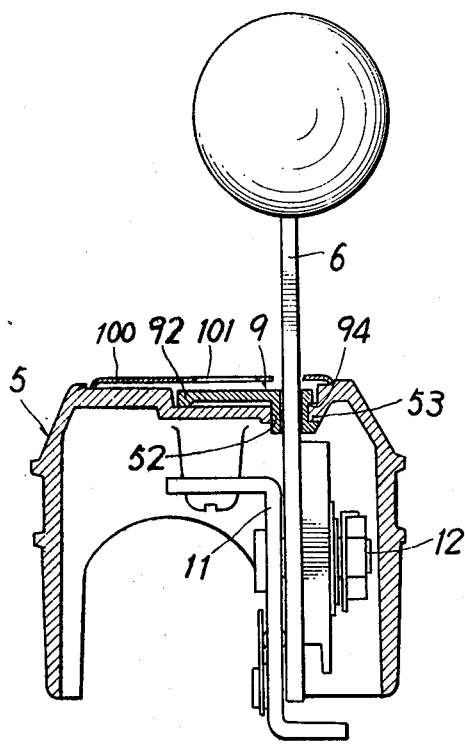
Figure 14:
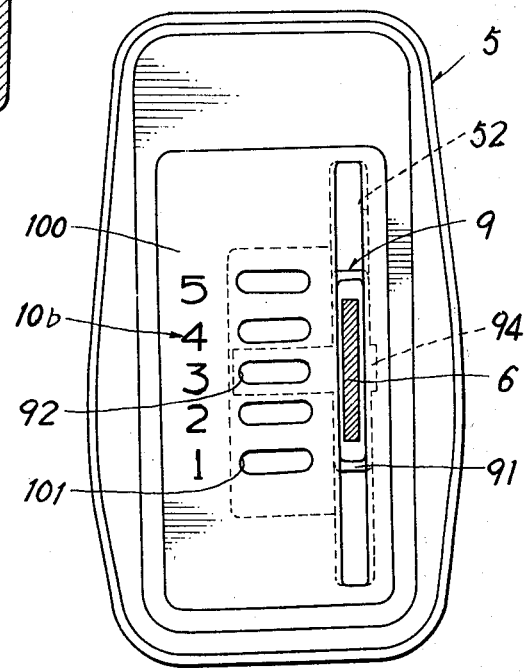

The above and further objects and novel features of the invention will more fully appear from the following description when the same is read in connection with the accompanying drawings, in which:

FIG. 1 is a partially cutaway side view of the lever operating device of an embodiment of the invention, FIG. 2 is a partially cutaway front view thereof, in which a part of the cover is omitted, FIG. 3 is a sectional view taken on Line III—III in FIG. 2, FIG. 4 is a sectional view taken on Line IV—IV in FIG. 2, FIG. 5 is a partially cutaway side view, of only a portion of the lever, FIG. 6 is a schematic section of a modified embodiment corresponding to FIG. 4, FIG. 7 is a plan view thereof of the indicator only, FIG. 8 is a side view thereof of the indicator only, FIGS. 9 through 14 showing a further modified embodiment different in shape from those shown in FIGS. 1 to 8, FIG. 9 is a front view of a further modified embodiment, showing the partially cutaway cover and lever, FIG. 10 is a partially cutaway front view thereof of the embodiment of FIG. 9, FIG. 11 is a plan view of the embodiment in FIG. 9, showing the lever partially cutaway at its intermediate portion, FIG. 12 is a perspective view of the principal portion only of the FIG. 9 embodiment, FIG. 13 is a partially cutaway view of a still further modified embodiment corresponding to FIG. 9, and FIG. 14 is a plan view of the embodiment shown in FIG. 13 and corresponding to FIG. 11.

Referring to FIGS. 1 through 4, the reference numeral 1 designates a tightening band attached to a bicycle frame, such as a vertical tube F, the band having a fixed tubular spindle 2 projecting from its intermediate portion. The fixed spindle 2 carries thereon a cylindrical member 3 having at its outer periphery a flange 31 and has an axially central threaded bore 21 with which a headed screw 4 is screwed.

The reference numeral 5 designates a cover mounted axially outwardly of and opposite to the boss of the lever. The cover 5 is partially sandwiched between one end face of the cylindrical member 3 and the head of screw 4, so as to be secured by the tightening screw 4 through the cylindrical member 3 to a fixed member 11 integrated with the band 1. Also, the cover 5 has an outer round periphery on which are provided marks 10 representing the speed-change stages respectively.

The reference numeral 6 designates a lever supported rotatably to the fixed spindle 2 through the cylindrical member 3. The lever 6 has a boss having at the center an axially through hole fit to the outer diameter of the cylindrical member 3 and an annular inner chamber 61 adjacent to the hole, the chamber 61 being opened at one side of the boss. The chamber 61 accommodates therein a coiled spring 7 having one end abutted against the inner surface of the cover 5 and another end abutted against the bottom of the chamber 61 through a washer 8. The spring 7 urges the lever 6 toward the inner face of the flange 31 of the cylindrical member 3 to apply a predetermined rotational resistance to the lever 6.

The lever 6 is provided at its surface opposite to the cover with a recess 62 of a circular arc shape extending in the direction of turning the lever 6, into which recess an indicator 9 is partially insetably supported in relation of being movable in a given range.

The indicator 9 comprises a support 91 insertably engaged into the lever recess 62 in relation of being independently movable therein and a pointer 92. The support 91 is in contact with the cover 5 at its lever side surface, thereby being subjected to a prescribed resistance against travel of the indicator 9 along the recess 62.

The the indicator independently travels in a range determined by the length of the recess 62, the recess length being made approximately equal to the amount of play in the control wire when lever 6 is turned for changing speed from low to high and vice versa. Hence, at the beginning of speed change, the lever 6 is at first turned ahead of the indicator 9 according to the length of the recess and then the indicator 9 moves following the lever 6. The travel of the indicator is determined in consideration of the clearance S between the outer periphery of the control wire W and the inner periphery of a sheath K, the arrangement of both the wire and sheath, and the attachment thereof to the bicycle frame by cable mounting bands. In addition, an adjusting screw entering the recess 62 is attached to the lever 6, or an adjuster, such as a washer, is provided within the recess 62, thereby enabling the indicator 9 to be properly adjusted in its travel.

The marks 10, which are made mainly on a separate index plate 100 attached onto the outer surface of the cover 5, comprise scales 10a and figures or letters 10b representing the speed-change stages respectively. An index pointer 92 of the indicator 9 is arranged radially outwardly of the index plate 100 as shown in FIGS. 1 and 3.

The indicator 9 may be supported by its support 91 sliding between two opposite projections 63, 63 provided at the one side of the lever 6 as shown in FIG. 5 rather than being supported as shown in FIGS. 1-4.

In the construction thus far described, the pointer 92 is set to align with, for example, the high speed stage, and then the lever 6 is operated to change the speed. Only the lever 6 is initially turned in the length of the recess 62 and thereafter the indicator 9 follows the lever 6 to reach the desired mark, thereby allowing the pointer 92 to always accurately align with each scale 10a.

In addition to the above, a positioning and maintaining mechanism may be provided between the support 91 of the indicator 9 and the surface of cover 5 opposite to the lever 6 such that at one of the support 91 and the surface of the cover 5 are provided a plurality of recesses 51 spaced in correspondence with each of the speed-change stages and at the other is provided an engaging member 93 engaging with the recesses 51 at every speed-change stage. Thus when the lever 6 is turned for changing the speed, the indicator 9 is subjected to the predetermined resistance and also can position the lever 6 and a sound correspondingly to each stage is generated to thereby enable the rider to bear the number of the speedchange stages.

The recesses 51 may be formed as ratchet teeth as shown in FIG. 4, or may be formed as concaved areas as shown in FIG. 6. The engaging member 93 may be a ball separately provided or a projection from one of the cover 5, and indicator 9.

With the construction illustrated in FIGS. 4 and 6; the indicator 9 is made elastic to be deflected when the engaging member 93 travels from one engaging recess 51 to an adjacent one, whereby the engagement is easy yet reliable. For this purpose, the indicator 9 is preferably made from selected materials and the support 91 is hollowed and curved as shown in FIGS. 6 through 8.

The described lever operating device, having a cover 5 abutting against the lever boss and the index marks 10, can also be constructed in the manner shown in FIGS. 9 through 14, in which the lever operating device is virtually identical to that illustrated in FIGS. 1-4. The difference is that the cover 5 is formed in a boxlike shape as shown in FIG. 9 which accommodates the fixed member 11 fixed to the bicycle frame by the tightening band (not shown); the fixed member 11 carries the lever 6 rotatably on a spindle 12; a slot 52 guiding therethrough the lever 6 and the index plate 100 are provided at the upper surface of cover 5; and, the indicator 9 is supported to the lever 6 in relation of being freely movable lengthwise thereof.

In greater detail, the lever 6 is formed as an elongated plate and has at a substantially lengthwise intermediate portion a widthwise roundly swollen abutment 64 at both sides thereof for abutting against the indicator 9, and the support 91 of the indicator 9 is formed in a rectangularly tubular shape lengthwise larger than the widthwise length of the abutment 64, into which the lever 6 is inserted, so that the indicator 9 may be movable in the direction of turning the lever 6 within a given range corresponding to the difference between lengths of the support 91 and abutment 64, and freely movable lengthwise of the lever 6. The slot 52 has at its one inner side a protrudent rail 53 with which opposite projections 94 at the support 91 are engaged, so that the indicator 9 is subjected to a predetermined resistance against its movement through the engagement of the rail 53 with the projections 94.

As in previous embodiment the indicator 9 is held stationary by the resistance at the initial operation of lever 6 for changing the speed as the lever 6 turns ahead of the indicator 9 within a prescribed range, and thereafter the indicator 9 moves following movement of the lever 6.

Prior to changing the speed the pointer 92 is set to align with, for example, the scale 10a of a high speed stage, and then the lever 6 is turned. Initially, only the lever 6 is turned and then the indicator 9 follows the lever 6 to reach a selective scale corresponding to a selected speed-change stage to thereby always cause the pointer 92 to accurately align therewith.

Furthermore, the widthwise roundly swollen abutment 64 at both sides of the lever 6 causes the indicator 9 to move a constant amount regardless of the angle of the lever turn, thereby allowing the pointer 92 to meet each of the scales 10a corresponding to each of the speed-change stages.

The index plate 100, which is attached to the cover 5 aside of the pointer 92 as shown in FIGS. 9 through 12, may be constructed larger so as to cover the pointer 92 as shown in FIGS. 13 and 14.

In this instance, the pointer 92 is colored at its upper surface and a plurality of through holes 101 are provided at the surface of the index plate 100 opposite to the pointer 92, the holes 101 corresponding to the speed-change stages respectively. The marks 10b of figures or letters are made aside of theholes 101 so that the rider may read the mark by the pointer 92 visible through the holes 101. Hence, the pointer 92 tip is reliably protected so as not to be bent.

Additionally, in the embodiment in FIGS. 9 through 14, the lever 6 may be provided with an elongate slot in which the support 91 of the indicator 9 is inserted.

As clearly understood from the aforesaid description, the lever operating device of the invention is constructed such that the indicator is supported at one side of the lever in relation of being rotatable only after the lever moves a predetermined amount, whereby the indicator is allowed to follow the lever turn at a fixed delayed distance. As a result, the play of the control wire in the direction of lever turning during speed change flom low to high and vice versa, is absorbed and thereafter the indicator is movable together with the lever, whereby the pointer is allowed to always accurately coincide with the scales corresponding to respective speed-change stages, so as to accurately enable the rider to read the mark representing a selected gear.

Furthermore, the indicator movable in the constant range with respect to the lever, can be combined with the positioning mechanism for the speed-change stage to generate sounds indicating the speed-change stage and to increase the clicking feel of the device to an operator regardless of the type of wire when using a push-pull or pull type wire.

While several embodiments of the invention have been described above and are preferred forms, it is to be understood that other forms of the invention might be adopted, all coming within the scope of the claims which follow.

What is claimed is:

1. A lever operating device for a gear-shifting means of a bicycle comprising:
   a fixed member fixed to a frame of the bicycle;
   a shaft supported to said fixed member;
   a lever supported rotatably with respect to said shaft;
   a movable control wire for a gear shift having one end directly connected to one end of said lever;
   an outer sheath covering for said control wire having one end corresponding to said one end of said control wire supported to said fixed member;
   a cover mounted stationarily to said fixed member covering a boss of said lever and having marks thereon representing speed-change stages; said lever having an indicator for indicating the position of said lever; said indicator being movable in a given range with respect to said lever in the same direction as the turning of said lever;
   means for providing a prescribed resistance against movement of said indicator; and,
   means responsive to the turning of said lever for causing said indicator to remain stationary during a predetermined amount of movement of said lever and for thereafter causing said indicator to follow the turning of said lever lagging behind it a constant distance.

2. The lever operating device for a gear-shifting means according to claim 1, wherein said cover is round at its outer periphery and is mounted to said boss of the lever axially outwardly with respect thereto in relation of being opposite to said boss, said marks being provided at the outer periphery of said cover, and wherein said indicator comprises a support and a pointer, said support being supported to one side of the lever at a side of said cover so as to be movable in a given range and being in contact with said side of the cover to form said means for providing said prescribed resistance against movement, said pointer being positioned radially outwardly of said outer round periphery of said cover.

3. The lever operating device for a gear-shifting means according to claim 2, wherein said lever is provided at its one side with an elongated circular arc shaped recess, said support of said indicator being inserted into said recess and being movable in a given range with respect to the lever.

4. The lever operating device for a gear-shifting means according to claim 2, wherein at said one side of the lever are provided two opposite rectangular projections, said support of said indicator being inserted between said projections and being movable in a given range with respect to said lever.

5. The lever operating device for a gear-shifting means according to claim 2, wherein between said support of the indicator and one side of said cover at a side of said lever is provided a positioning mechanism for said speed-change stages.

6. The lever operating device for a gear-shifting means according to claim 5, wherein said positioning mechanism comprises recesses positioned on one of said support and said cover and an engaging member engageable with each of said recesses positioned on the other of said support and cover.

7. The lever operating device for a gear-shifting means according to claim 5, wherein said positioning mechanism comprises ratchet teeth positioned on one of said support and cover and an engaging member engageable with said teeth positioned on the other of said support and cover.

8. The lever operating device for a gear-shifting means according to claim 6, wherein said indicator is provided with laid engaging member and is made elastically deformable.

9. The lever operating device for a gear-shifting means according to claim 1, wherein said cover is box-like shaped and has at its upper surface said marks and a slot for guiding said lever therethrough, said lever being inserted into said guiding slot and said guiding slot having a rail for guiding said lever together with said indicator supported thereto, and said indicator comprises a support and a pointer, said support being supported to a substantially intermediate portion of said lever so as to be movable in a given range, and having an engaging portion engageable with said rail to form said means for applying said prescribed resistance against movement, said pointer being positioned above the upper surface of said cover provided with said marks.

10. The lever operating device for a gear-shifting means according to claim 2, wherein at a substantially intermediate portion of said lever is provided an elongate slot extending in the direction of turning the lever, said slot being inserted with said support of said indicator so that said support may be supported with respect to said lever so as to be movable in a given range.

11. The lever operating device for a gear-shifting means according to claim 9, wherein said indicator support comprises a rectangular tube having a longitudinal length larger than a widthwise length of said substantially intermediate portion of the lever, said tubular support being insertably supported onto said intermediate portion of said lever so as to be movable in a fixed range with respect to said lever.

* * * * *